Jan. 10, 1950 J. RILEY 2,493,999
SMALL SYNCHRONOUS ELECTRIC MOTOR
Filed Sept. 24, 1946
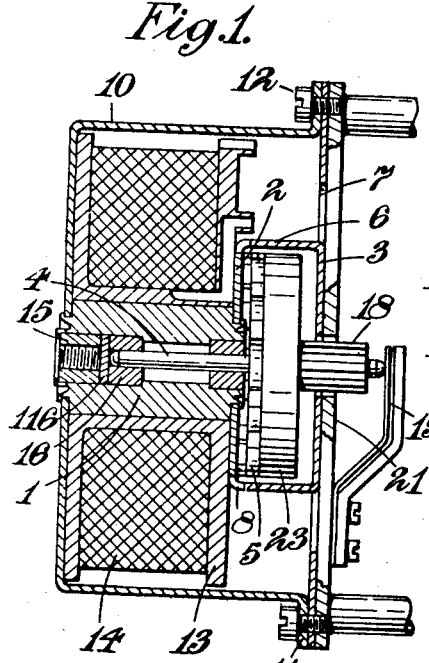
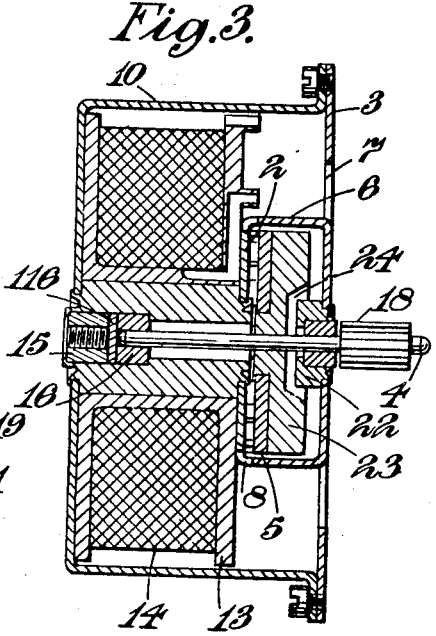
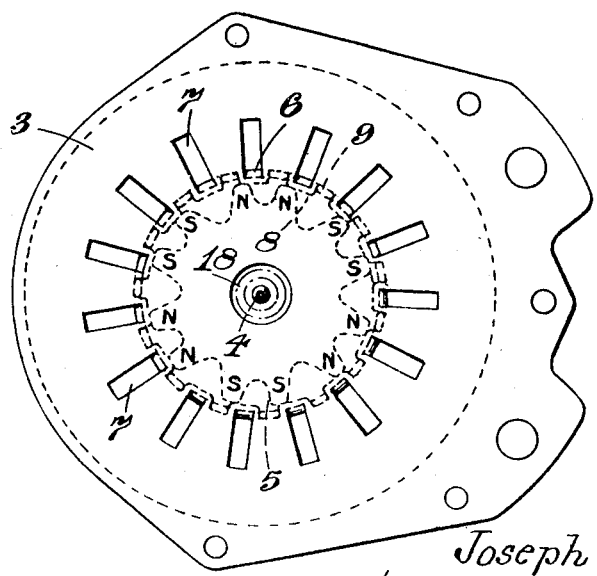
Inventor
Joseph Riley
by Wilkinson & Mawhinney
Attorneys Patented Jan. 10, 1950

2,493,999

UNITED STATES PATENT OFFICE 2,493,999

SMALL SYNCHRONOUS ELECTRIC MOTOR

Joseph Riley, Cheltenham, England, assignor, by direct and mesne assignments, of one-half to Riley Clock and Instrument Company Limited, Saltburn, England, a British company and one-half to S. Smith & Sons (England) Limited, London, England, a British company Application September 24, 1946, Serial No. 699,057 In Great Britain September 7, 1945

2 Claims. (Cl. 172—275)

This invention relates to small synchronous electric motors, such as are adapted for use in electric clocks, motors and for other like purposes, and particularly to such motors of the type (hereinafter referred to as the type described) having a stator of the kind comprising two sheet-iron parts, on one of which sheet-iron parts an annular arrangement of pole pieces is formed by pressing out tongues from slotted portions of it, and the second sheet-iron part has a portion which is slotted or gapped to form complementary pole pieces, the pole pieces of the two parts extending in opposite directions, a spindle carrying a rotor rotatable concentrically within the pole pieces, and an annular field winding for energising the stator.

In an electric motor of the type described proposed heretofore the field winding was mounted between two plates constituting the two sheet-iron parts of the stator, and the present invention has for its main object to provide an improved electric motor of the type described of compact construction in which the field winding is arranged in an improved manner.

According to the present invention there is provided in or for use in a small synchronous electric motor of the type described, a stator of the kind described, characterised in that the field winding is arranged outside the space between the two sheet-iron stator parts having the pole pieces.

Conveniently one of the sheet-iron stator parts is formed or provided on the otherwise open end of a cup-shaped member, and has its annular arrangement of pole pieces formed by pressing out tongues from portions of it having closed slots.

The invention also provides a synchronous electric motor of the type described comprising a stator as set forth above, wherein a hollow core is surrounded by the field winding, on one end of which core one stator part is mounted, the rotor spindle being journalled in the core.

When the rotor spindle is journalled in the core by means of two bearings arranged in spaced relation at or towards opposite ends of the core, one bearing situated adjacent to the closed end of the cup-shaped member may be provided with a thrust washer.

When one bearing of the rotor spindle is accommodated in the core, a second bearing may be carried by the stator part formed or provided on the end of the cup-shaped member.

A flywheel may be mounted on the rotor spindle adjacent to the rotor.

In order that the invention may be clearly understood and readily carried into effect, reference is made to the accompanying drawings which illustrate diagrammatically and by way of example two embodiments of the invention. In said drawings—

Figure 1 is a vertical section taken through one construction of small synchronous electric motor in accordance with the invention, and Figure 2 is an end elevation thereof, some parts being omitted;

Figure 3 is a vertical section taken through a modified construction of small synchronous electric motor also in accordance with the present invention.

Like references designate like parts throughout the several views.

Referring first to Figures 1 and 2, a small non-self-starting synchronous electric motor of the type described comprises a hollow metal core 1, a stator comprising two sheet iron plates 2, 3 carried thereby, a spindle 4 journalled in the core, and a rotor 5 carried by the spindle. One 3 of the stator plates, hereinafter referred to as the outer plate, has an annular arrangement of pole pieces formed by pressing out tongues 6 from slotted portions of it, the slots 7 from which the tongues are formed being closed. The second stator plate 2, hereinafter referred to as the inner plate, has formed on it a cylindrical portion which has open-ended slots or gaps 8 to form the complementary pole pieces 9. The pole pieces on the two plates extend in opposite directions towards one another. A cup-shaped member 10 or housing forming part of the stator has an aperture in its closed end, in which aperture one end of the core 1 is fixed. The open end of the cup-shaped member 10 has an external peripheral flange 11, to which the outer stator plate 3 is attached as by screws 12 or in some other convenient manner. The other end of the core 1 carries the inner stator plate 2.

A former 13 carrying an annular field winding closely surrounds the core, and lies in the space between the end wall of the cup-shaped housing 10 and the inner stator plate 2.

A bush 15 of brass or other convenient material makes a press fit in the core 1 at its end, and may be tapped to provide a means of securing a suitable cover for the whole unit, where required. A plain bearing 16 for the spindle may be arranged adjacent the bush 15, which bearing may be provided with a thrust washer 116. A second plain bearing 17 for the spindle 4 may be arranged at the other end of the core adjacent to the inner stator plate 2, and the rotor 5 on the spindle 4 may be adjacent to this second bearing.

The space within the core between the two bearings may be utilised as a reservoir for lubricant, such as oil-retaining material.

A driving pinion 18 on the spindle constitutes driving means for driving any mechanism to be actuated by the motor; this pinion may extend with play through a central aperture formed in that portion of the outer stator plate which lies centrally within its ring of slots for forming the pole pieces. The outer end of the spindle 4 may abut against a leaf spring 19 carried by an abutment 20 fixed to the outer stator plate or on a member 21, such as a movement plate of a clock adjacent thereto, for restricting end play of the rotor spindle and keeping the rotor spindle up, against the thrust washer. Such a movement plate may be attached to pillars by the same screws as are used for fixing the outer stator plate to the peripheral flange of the housing.

The modified construction of motor shown in Figure 3 is similar to that described above with reference to Figures 1 and 2, but differs therefrom in that the front bearing adjacent to the stator plate is dispensed with, and instead thereof an external bearing 22 for the spindle is fixed in the central aperture of the outer stator plate. In this construction the pinion 18 lies entirely outside the outer stator plate 3, so that it can be conveniently removed, and assembly of the motor is facilitated. This construction and also that first described above is very compact, and all parts of the motor are adequately protected.

The invention provides an improved motor which can be manufactured at a low cost by mass production methods in a convenient and economical manner, and permits a bearing for the rotor spindle to be carried by the outer stator plate if required for certain uses. Both constructions afford full protection to the field winding and rotor assembly which may include a flywheel 23 fast on the spindle adjacent to the rotor.

Various modifications may be made in the details of construction described above without departing from the invention. For example, the flywheel 23 may have a central lateral recess, such as 24 shown in Figure 3, into which the bearing 22 on the outer stator plate 3 may extend in order to reduce the overall size of the motor. Also, the invention is not restricted to non-self-starting motors, as the provision of a suitable device applied to the rotor will render the motor self-starting.

I claim:

1. A small synchronous motor comprising a cup like casing, a stator, a hollow core of magnetic material within and rising from the bottom of said casing, a field winding for receiving an A. C. supply, said field winding being carried by and partially enveloping said hollow core, said stator comprising two spaced sheet-iron parts one of which is carried by said hollow core at one end thereof, the other of said sheet-iron parts carried by and forming the cover for said casing, a plurality of pole pieces stamped from said sheet-iron parts in staggered alternate relationship forming complemental poles spaced apart circumferentially coaxial with said hollow core, said sheet-iron parts forming a part of the magnetic circuit, a multipole rotor and spindle within the circumscribed area of said pole pieces, and bearing means for rotatably supporting said spindle within said hollow core at one end and within one of said stator sheet-iron plates at the other end.

2. A small synchronous motor comprising a cup like casing of magnetic material, a stator carried by said casing, a hollow core of magnetic material, a field winding for receiving an A. C. supply, said field winding being carried by and partially enveloping said hollow core, said stator comprising two spaced sheet-iron parts one of which is carried by said hollow core at one end thereof, the other of said sheet-iron parts carried by and forming a cover for said casing, a plurality of pole pieces stamped from said sheet-iron parts in staggered alternate relationship forming complemental poles spaced apart circumferentially coaxial with said hollow core, said sheet-iron parts forming a part of the magnetic circuit, a multipole rotor and spindle within the circumscribed area of said pole pieces, said multipole rotor and spindle being a rotor having pairs of like adjacent poles and a flywheel carried adjacent thereto, said flywheel increasing the inertia during periods of slippage, and bearing means for rotatably supporting said spindle within said hollow core at one end and within one of said stator sheet-iron plates at the other end.

JOSEPH RILEY.

REFERENCES CITED

The following references are of record in the file of this patent:

UNITED STATES PATENTS

| Number | Name | Date |
|---|---|---|
| 1,959,391 | Spencer | May 22, 1934 |
| 1,962,770 | Holtz | June 12, 1934 |
| 2,250,395 | Russell | July 22, 1941 |
| 2,383,829 | Swift | Aug. 28, 1945 |

FOREIGN PATENTS

| Number | Country | Date |
|---|---|---|
| 493,928 | Great Britain | of 1938 |